United States Patent
Son et al.

(10) Patent No.: US 10,650,977 B2
(45) Date of Patent: May 12, 2020

(54) CERAMIC ELECTRONIC COMPONENT AND METHOD OF MANUFACTURING THE SAME AND ELECTRONIC DEVICE

(71) Applicants: SAMSUNG ELECTRONICS CO., LTD., Suwon-si, Gyeonggi-do (KR); NATIONAL INSTITUTE FOR MATERIALS SCIENCE, Tsukuba-shi, Ibaraki (JP)

(72) Inventors: Yoon Chul Son, Hwaseong-si (KR); Minoru Osada, Ibaraki (JP); Takayoshi Sasaki, Ibaraki (JP); Chan Kwak, Yongin-si (KR); Doh Won Jung, Seoul (KR); Youngjin Cho, Suwon-si (KR)

(73) Assignees: SAMSUNG ELECTRONICS CO., LTD., Gyeonggi-Do (KR); NATIONAL INSTITUTE FOR MATERIALS SCIENCE, Tsukuba-shi, Ibaraki (JP)

( * ) Notice: Subject to any disclaimer, the term of this patent is extended or adjusted under 35 U.S.C. 154(b) by 0 days.

(21) Appl. No.: 16/164,869

(22) Filed: Oct. 19, 2018

(65) Prior Publication Data

US 2019/0131077 A1    May 2, 2019

(30) Foreign Application Priority Data

Oct. 27, 2017    (KR) .................. 10-2017-0141217

(51) Int. Cl.
*H01G 4/33*    (2006.01)
*H01G 4/248*    (2006.01)
(Continued)

(52) U.S. Cl.
CPC ............... *H01G 4/33* (2013.01); *H01C 7/008* (2013.01); *H01C 7/10* (2013.01); *H01G 4/012* (2013.01);
(Continued)

(58) Field of Classification Search
CPC    H01G 4/08; H01G 4/012; H01G 4/12; H01G 4/30; H01G 4/33; H01G 4/248; H01G 4/1227; H01G 4/232
See application file for complete search history.

(56) References Cited

U.S. PATENT DOCUMENTS

| 6,437,969 B2* | 8/2002 | Mizuno ................ C01G 23/006 361/306.1 |
| 7,583,493 B2* | 9/2009 | Tani ........................ B32B 18/00 29/25.42 |

(Continued)

FOREIGN PATENT DOCUMENTS

| JP | 5688816 B2 | 3/2015 |
| JP | 5885150 B2 | 3/2016 |

(Continued)

OTHER PUBLICATIONS

Kosho Akatsuka et al., "Construction of Highly Ordered Lamellar Nanostructures through Langmuir", ACS NANO, American Chemical Society, Apr. 29, 2009, pp. 1097-1106, vol. 3, No. 5.

(Continued)

*Primary Examiner* — Nguyen T Ha
(74) *Attorney, Agent, or Firm* — Cantor Colburn LLP

(57) ABSTRACT

A method of manufacturing a ceramic electronic component includes forming a dielectric layer including a plurality of ceramic nanosheets on a first electrode, treating the dielectric layer with an acid, and forming a second electrode on the dielectric layer, a ceramic electronic component, and an electronic device.

10 Claims, 18 Drawing Sheets

(51) Int. Cl.
*H01G 4/012* (2006.01)
*H01G 4/12* (2006.01)
*H01C 7/10* (2006.01)
*H01C 7/00* (2006.01)
*H01G 4/30* (2006.01)

(52) U.S. Cl.
CPC ............... *H01G 4/12* (2013.01); *H01G 4/248* (2013.01); *H01G 4/30* (2013.01)

(56) References Cited

U.S. PATENT DOCUMENTS

| | | | |
|---|---|---|---|
| 9,082,551 B2 | 7/2015 | Osada et al. | |
| 9,543,500 B2 | 1/2017 | Osada et al. | |
| 9,741,493 B2* | 8/2017 | Kawamoto | H01G 4/30 |
| 10,457,583 B2* | 10/2019 | Ishida | G21C 17/0225 |
| 2010/0226067 A1* | 9/2010 | Osada | C04B 35/016 |
| | | | 361/311 |
| 2011/0147060 A1* | 6/2011 | Osada | B82Y 10/00 |
| | | | 174/258 |
| 2016/0009561 A1 | 1/2016 | Coleman et al. | |
| 2017/0025505 A1* | 1/2017 | Geohegan | H01L 21/0332 |
| 2017/0094723 A1* | 3/2017 | Kim | B22F 1/0025 |

FOREIGN PATENT DOCUMENTS

| | | |
|---|---|---|
| KR | 1563231 B1 | 10/2015 |
| KR | 20160023639 A | 3/2016 |

OTHER PUBLICATIONS

Mingming Fang et al., "Dielectric Properties of the Lamellar Niobates and Titanoniobates AM2Nb3O10 and ATiNbO5 (A) H, K, M ) Ca, Pb), and Their Condensation Products Ca4Nb6O19 and Ti2Nb2O9", Chemistry of Materials, May 6, 1999, pp. 1519-1525, vol. 11, No. 6.

Mingming Fang et al., "Layer-by-Layer Growth and Condensation Reactions of Niobate and Titanoniobate Thin Films", Chemistry of Materials, May 6, 1999, pp. 1526-1532, vol. 11, No. 6.

Y.Ebina et al., "Study on exfoliation of layered perovskite-type niobates", Solid State Ionics, Nov. 2002, pp. 177-182, vol. 151, Issues 1-4.

* cited by examiner

CERAMIC ELECTRONIC COMPONENT AND METHOD OF MANUFACTURING THE SAME AND ELECTRONIC DEVICE

CROSS-REFERENCE TO RELATED APPLICATION

This application claims priority to and the benefit of Korean Patent Application No. 10-2017-0141217 filed in the Korean Intellectual Property Office on Oct. 27, 2017, and all the benefits accruing therefrom under 35 U.S.C. § 119, the entire contents of which are incorporated herein by reference.

BACKGROUND

1. Field

A ceramic electronic component and a method of manufacturing the same, and an electronic device are disclosed.

2. Description of the Related Art

Electronic components that may include ceramic include a capacitor, an inductor, a piezoelectric device, a varistor, or a thermistor, etc. A capacitor, which is an electronic component used for obtaining capacitance, may be provided in an electronic circuit. A multi-layer ceramic capacitor (MLCC), which is an example of a capacitor, includes a plurality of capacitors and is formed in, for example, a chip shape, and may be mounted in a flexible printed circuit (FPC) of various electronic devices such as an image device of a liquid crystal display (LCD), a computer, a mobile phone, and the like, to charge and discharge electricity, and may be used in a device for coupling, decoupling, impedance matching, and the like.

According to specifications for providing electronic devices with improved functionality, improved efficiency, and a reduced size, it may be desirable to form a ceramic electronic component such as a multi-layer ceramic capacitor mounted in the electronic device with improved performance and a reduced size.

SUMMARY

An embodiment provides a ceramic electronic component that is capable of embodying a small-size and a high capacitance.

An embodiment provides a method of manufacturing the ceramic electronic component capable of embodying a small-size and a high capacitance without additional complex processes.

An embodiment provides an electronic device including the ceramic electronic component.

According to an embodiment, a method of manufacturing a ceramic electronic component includes forming a dielectric layer including a plurality of ceramic nanosheets on a first electrode, treating the dielectric layer with an acid, and forming a second electrode on the dielectric layer to provide the ceramic electronic component.

The treating of the dielectric layer with the acid may include contacting the dielectric layer with hydrochloric acid, nitric acid, sulfuric acid, or a combination thereof.

The treating of the dielectric layer with the acid may be performed at about 25° C. to about 100° C. for about 1 hour to about 10 hours.

The treating of the dielectric layer with the acid may be performed at about 50° C. to about 100° C. for about 1 hour to about 5 hours.

The method may further include preparing the plurality of ceramic nanosheets and the preparing of the plurality of ceramic nanosheets may include preparing a layered ceramic material and exfoliating the layered ceramic material to provide the plurality of ceramic nanosheets.

The preparing of the layered ceramic material may include preparing a mixture including a metal oxide and an alkali metal compound or an alkaline-earth metal compound and heat-treating the mixture to obtain a layered ceramic material having a structure in which the alkali metal or the alkaline-earth metal is disposed between a plurality of metal oxide layers.

The preparing of the layered ceramic material may further include acid-exchanging the layered ceramic material having the structure in which the alkali metal or the alkaline-earth metal is disposed to obtain a layered proton-exchanged ceramic material in which at least one part of the alkali metal or the alkaline-earth metal is substituted with a proton or a hydronium ion.

The exfoliating of the layered ceramic material may include contacting the layered ceramic material with an intercalant to perform interlayer exfoliation.

The intercalant may include a C1 to C20 alkylammonium salt compound.

The intercalant may include tetramethylammonium hydroxide, tetraethylammonium hydroxide, tetrapropylammonium hydroxide, tetrabutylammonium hydroxide, benzylmethylammonium hydroxide, or a combination thereof.

The forming of the dielectric layer may include forming the plurality of ceramic nanosheets in a lateral direction to form a monolayer dielectric layer and laminating a plurality of monolayer dielectric layers to form a multi-layer dielectric layer, wherein the lateral direction is orthogonal to a thickness direction of the monolayer dielectric layer.

The forming of the monolayer dielectric layer may be performed by a Langmuir-Blodgett method, a layer-by-layer method, a spin coating, a slit coating, a bar coating, or a dip coating.

The treating of the dielectric layer with the acid may include contacting the multi-layer dielectric layer with an acid solution including hydrochloric acid, nitric acid, sulfuric acid, or a combination thereof.

The forming of the dielectric layer may further include preparing a composite material of a bulk ceramic dielectric material and the multi-layer dielectric layer.

The forming of the composite material may include mixing the bulk ceramic dielectric material and the multi-layer dielectric layer and sintering the mixture.

The preparing of the composite material may include coating the multi-layer dielectric layer on a surface of the bulk ceramic dielectric material to provide a coated bulk ceramic dielectric material and sintering the coated bulk ceramic dielectric material.

According to an embodiment, a ceramic electronic component includes a first electrode and a second electrode facing each other; and a dielectric layer disposed between the first electrode and the second electrode, wherein the dielectric layer includes a multi-layer dielectric layer including a 2-dimensional nanosheet monolayer film comprising a plurality of ceramic nanosheets arranged in a lateral direction and the multi-layer dielectric layer includes a proton or a hydronium ion between layers of the multi-layer dielectric layer, wherein the lateral direction is orthogonal to a thickness direction of the 2-dimensional nanosheet monolayer film.

The multi-layer dielectric layer may have a first surface contacting the first electrode and a second surface facing the first surface, and a proton content of the multi-layer dielectric layer according to secondary ion mass spectrometry (SIMS) may be constant or increasing in a direction from the second surface toward the first surface.

A proton content at the first surface of the multi-layer dielectric layer according to secondary ion mass spectrometry (SIMS) may be greater than or equal to about 0.5 at %.

A carbon content of the multi-layer dielectric layer according to secondary ion mass spectrometry (SIMS) may be less than or equal to about 3.5 atomic percent (at %).

A carbon content of the multi-layer dielectric layer according to secondary ion mass spectrometry (SIMS) may be less than or equal to about 2.5 at %.

A gap between adjacent layers of the monolayer dielectric layer may be less than or equal to about 1.65 nanometers (nm).

The dielectric layer may include a composite material of a bulk ceramic dielectric material and the multi-layer dielectric layer.

The dielectric layer may include a plurality of grains including the bulk ceramic dielectric material and a grain boundary including the multi-layer dielectric layer.

According to an embodiment, an electronic device including the ceramic electronic component is provided.

A small-size and a high capacitance of the ceramic electronic component may be embodied without additional complex processes.

DETAILED DESCRIPTION

Figure 1:
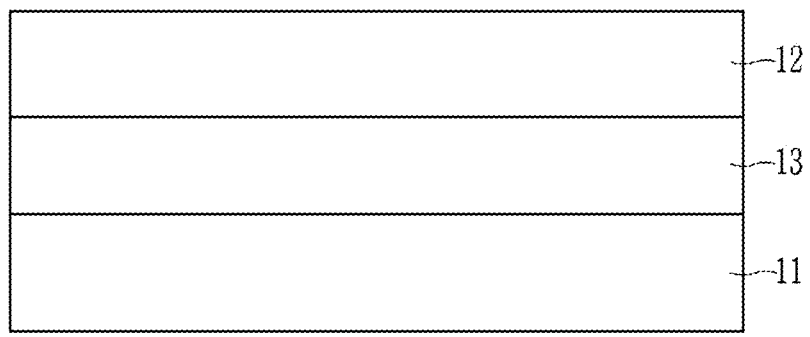
FIG. 1 is a schematic cross-sectional view of a capacitor as an embodiment of a ceramic electronic component.

Hereinafter, example embodiments of the present disclosure will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "2-dimensional" as used herein refers to a structure having a shape defined by two dimensions. For example, a 2-dimensional nanosheet may denote a nanosheet, although the nanosheet has three dimensions, of which lengths of two dimensions are significantly greater than that of the other one dimension, and the whole size of the nanosheet is determined by the lengths of the two dimensions, such as a plate shape.

Hereinafter, a ceramic electronic component according to an embodiment is described with reference to drawings.

Figure 2:
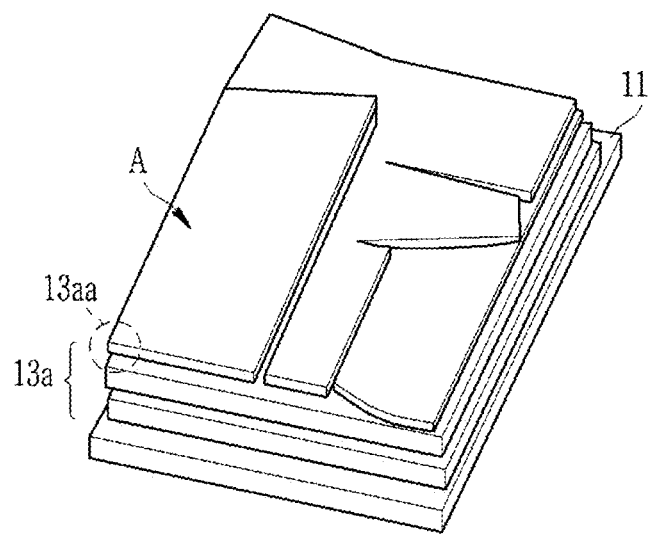
FIGS. 2 and 3 are schematic views illustrating multi-layer dielectric layers of the capacitor of FIG. 1, FIGS. 4 to 12 are schematic views sequentially illustrating a method of manufacturing the ceramic electronic component of FIG. 1.
Figure 3:
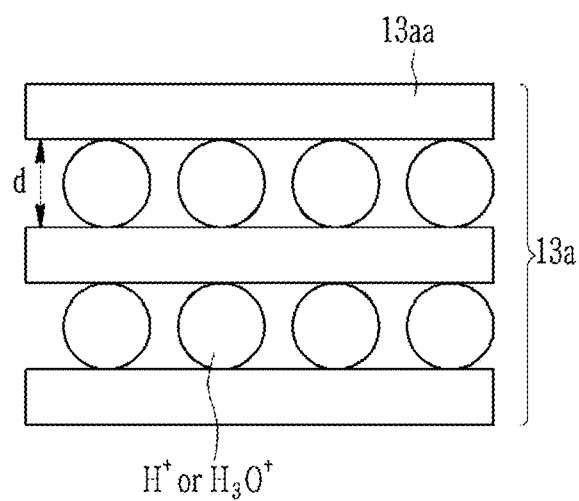

FIG. 1 is a schematic cross-sectional view of a capacitor as an embodiment of a ceramic electronic component and FIGS. 2 and 3 are schematic views illustrating multi-layer dielectric layers of the capacitor of FIG. 1.

Referring to FIG. 1, the capacitor 10 according to an embodiment includes a pair of electrodes 11 and 12 facing each other and a dielectric layer 13.

The pair of electrodes 11 and 12 includes a conductor such as a metal, for example, nickel (Ni), gold (Au), platinum (Pt), palladium (Pd), copper (Cu), silver (Ag), tin (Sn), an alloy thereof, or a combination thereof, but is not limited thereto. The pair of electrodes 11 and 12 may be for example a metal plate for example a conductive layer disposed on a substrate (not shown) or a metal plated plate on a substrate (not shown). Herein, the substrate may be for example a glass substrate, a semiconductor substrate, a polymer substrate, or a combination thereof, but is not limited thereto.

The dielectric layer 13 is disposed between the pair of electrodes 11 and 12, and the pair of electrodes 11 and 12 are electrically insulated by the dielectric layer 13.

The dielectric layer 13 may include a multi-layer dielectric layer 13a.

Referring to FIG. 2, the multi-layer dielectric layer 13a may have a structure in which a plurality of 2-dimensional nanosheet monolayer films 13aa, in which a plurality of 2-dimensional ceramic nanosheets A is arranged in a lateral direction, e.g., a direction orthogonal to a thickness direction of the 2-dimensional nanosheet monolayer films 13aa, is laminated. However, it is not limited thereto, and the dielectric layer 13 may include a 2-dimensional nanosheet monolayer film which is not laminated.

The 2-dimensional ceramic nanosheet (hereinafter, referring to as a 'nanosheet') A may be, for example, an exfoliated structure obtained from a layered bulk ceramic material. The nanosheet A may be for example made of a ceramic material having a permittivity of greater than or equal to about 10, for example, greater than or equal to about 30, greater than or equal to about 50, greater than or equal to about 80, or greater than or equal to about 100. The nanosheet A may be for example a metal oxide nanosheet, and may include for example $Ca_2N_3NbO_{10}$, $Ca_2Na_2Nb_5O_{16}$, $Ca_2Nb_3O_{10}$, $Sr_2Nb_3O_{10}$, $SrBi_4Ti_4O_{15}$, $Ti_2NbO_7$, $LaNb_2O_7$, or a combination thereof, but is not limited thereto.

Each nanosheet A may have a thin sheet-shape having a predetermined average lateral size. The lateral size of the nanosheet A may range for example about 0.1 micrometers (μm) to about 30 μm, about 0.2 μm to about 20 μm, about 0.3 μm to about 15 μm, or about 0.5 μm to about 10 μm. An average thickness of the nanosheet A may be for example less than or equal to about 5 nm, less than or equal to about 3 nm, less than or equal to about 2 nm, or less than or equal to about 1.5 nm. The lateral size of the nanosheet A is measured in a direction orthogonal to the thickness of the nanosheet A. The lateral size and the thickness of the nanosheet A may be determined depending upon the synthesizing and exfoliating conditions in the synthesis and exfoliation steps of the bulk ceramic material.

The 2-dimensional nanosheet monolayer film 13aa may have pores generated between a plurality of adjacent nanosheets A, and the porosity thereof may be, for example, less than or equal to about 12%, less than or equal to about 11%, less than or equal to about 10%, less than or equal to about 9%, or less than or equal to about 8.5%. The porosity may be defined by a ratio of an area of opened area where is not covered by the nanosheet A to the total area of the 2-dimensional nanosheet monolayer film 13aa, that is, a ratio of an area of pores to the total area of the 2-dimensional nanosheet monolayer film 13aa.

A thickness of the 2-dimensional nanosheet monolayer film 13aa may be less than or equal to about 0.5 μm, for example, less than or equal to about 0.3 μm, less than or equal to about 0.2 μm, or less than or equal to about 0.1 μm.

The multi-layer dielectric layer 13a may include, for example, about 2 layers to about 100 layers of the 2-dimensional nanosheet monolayer film 13aa, for example, about 3 layers to about 80 layers of the 2-dimensional nanosheet monolayer film 13aa, for example, about 5 layers to about 50 layers of the 2-dimensional nanosheet monolayer film 13aa, or for example, about 5 layers to about 30 layers of the 2-dimensional nanosheet monolayer film 13aa.

Referring to FIG. 3, adjacent 2-dimensional nanosheet monolayer films 13aa may be spaced apart from each other leaving a predetermined gap (d), and proton ($H^+$) and/or hydronium ion ($H_3O^+$) that may be bonded with a water molecule may be interposed between adjacent 2-dimensional nanosheet monolayer films 13aa. Hereinafter, a proton ($H^+$) and a hydronium ion ($H_3O^+$) may be referred to as a proton.

The proton interposed between 2-dimensional nanosheet monolayer films 13aa may flow between the 2-dimensional nanosheet monolayer films 13aa during acid-treatment of the multi-layer dielectric layer 13a, for example, provided by an acid solution including hydrochloric acid, nitric acid, sulfuric acid, or a combination thereof. The acid treatment may remove an organic material attached and/or adsorbed on nanosheets during the step of exfoliating the layered ceramic material, as described later, and the organic material present between adjacent 2-dimensional nanosheet monolayer films 13aa may be substituted with a proton by the acid treatment, and the organic material in the multi-layer dielectric layer 13a may be effectively decreased or removed. Deterioration of a permittivity by the organic material in the multi-layer dielectric layer 13a may be prevented, and a performance of the capacitor may be improved.

The proton may be predominantly present in a space between adjacent 2-dimensional nanosheet monolayer films 13aa, for example, the proton may be substantially uniformly present along, e.g., in, a thickness direction (depth) of the multi-layer dielectric layer 13a. In an embodiment, a proton content may be substantially constant in the thickness direction (depth) of the multi-layer dielectric layer 13a. In an embodiment, a proton content may vary, e.g., increase, in the thickness direction (depth) of the multi-layer dielectric layer 13a. The proton content or concentration may be measured by secondary ion mass spectrometry (SIMS).

In an embodiment, when the multi-layer dielectric layer 13a has a first surface contacting an electrode 11 and a second surface facing the first surface, the proton content of the multi-layer dielectric layer 13a measured according to secondary ion mass spectrometry (SIMS) may be substantially constant or may increase in a thickness direction (depth) from the second surface to the first surface. The phrase "thickness direction" or "depth" as used herein refers to a direction from a second surface of a multi-layer dielectric layer 13a to a first surface of the multi-layer dielectric layer 13a, the first surface of the multi-layer dielectric layer 13a contacting an electrode, and the second surface of the multi-layer dielectric layer 13a facing the first surface of the multi-layer dielectric layer 13a.

In an embodiment, the proton content on the first surface of the multi-layer dielectric layer 13a may be greater than or equal to about 0.5 at % ($5 \times 10^3$ counts per second (cps)), for example, greater than or equal to about 0.6 at % ($6 \times 10^3$ cps), greater than or equal to about 0.7 at % ($7 \times 10^3$ cps), greater than or equal to about 0.8 at % ($8 \times 10^3$ cps), greater than or equal to about 0.9 at % ($9 \times 10^3$ cps), or greater than or equal to about 1.0 at % ($10^4$ cps). The proton content of the multi-layer dielectric layer 13a that is treated with the acid may be, for example, greater than or equal to about 2 times, greater than or equal to about 3 times, greater than or equal to about 4 times, or greater than or equal to about 5 times the proton content of the multi-layer dielectric layer 13a that is not treated with the acid. For example, the proton content on the first surface of the multi-layer dielectric layer 13a may be, for example, less than or equal to about 10 at %, for example, less than or equal to about 8 at %, less than or equal to about 6 at %, or less than or equal to about 5 at %.

An organic material in the multi-layer dielectric layer 13a may be confirmed by a carbon content measured by secondary ion mass spectrometry (SIMS) and a carbon content of the multi-layer dielectric layer 13a according to secondary ion mass spectrometry (SIMS) may be less than or equal to about 3.5 at %, for example, less than or equal to about 3.2 at %, less than or equal to about 3.0 at %, less than or equal to about 2.8 at %, less than or equal to about 2.5 at %, less than or equal to about 2.2 at %, less than or equal to about 2.0 at %, less than or equal to about 1.8 at %, less than or equal to about 1.5 at %, less than or equal to about 1.2 at %, or less than or equal to about 1.0 at %. The carbon content is less than the carbon content the multi-layer dielectric layer 13a which is treated with the acid.

The organic material present between the multi-layer dielectric layers 13a is substituted with a proton, the gap (d) between adjacent 2-dimensional nanosheet monolayer films 13aa may be decreased, and the gap (d) between adjacent 2-dimensional nanosheet monolayer films 13aa may be, for example, less than or equal to about 1.68 nm, less than or equal to about 1.65 nm, less than or equal to about 1.62 nm, or less than or equal to about 1.60 nm. By reducing the gap (d) between adjacent 2-dimensional nanosheet monolayer films 13aa, the total thickness of the multi-layer dielectric layer 13a may be reduced, and the capacitance of the capacitor may be enhanced.

As the dielectric layer 13 includes the multi-layer dielectric layer 13a, the thickness of the dielectric layer 13 may be less than the thickness of a bulk dielectric layer using a bulk ceramic material, and the capacitance of the capacitor may be enhanced. The capacitance of the dielectric layer of a bulk ceramic material may be deteriorated when a grain size is decreased, and reducing a thickness of the dielectric layer may be limited; the dielectric layer including the 2-dimensional ceramic nanosheet may provide an improved capacitance with a thinner thickness without the thickness limits.

As described above, the organic material attached and/or adsorbed in the exfoliating step may be reduced or removed and substituted with a proton at the site of the organic material reduction or removal, and the multi-layer dielectric layer 13a may prevent the permittivity deterioration caused by the organic material, and simultaneously may enhance a capacitance of the capacitor by reducing the gap (d) between adjacent 2-dimensional nanosheet monolayer films 13aa.

Hereinafter, a method of manufacturing a ceramic electronic component shown in FIG. 1 is described with references to FIGS. 4 to 12 together with FIGS. 1 to 3.

FIGS. 4 to 12 are schematic views sequentially illustrating a method of manufacturing the ceramic electronic component of FIG. 1.

The method of manufacturing a ceramic electronic component according to an embodiment includes forming a dielectric layer 13 including a plurality of ceramic nanosheets on an electrode 11, treating the dielectric layer 13 with an acid, and forming an electrode 12 on the dielectric layer 13.

The plurality of ceramic nanosheets may be obtained from a layered ceramic material, and may be obtained by preparing a layered ceramic material and exfoliating the layered ceramic material.

The layered ceramic material may be for example obtained by heat-treating a mixture including a metal oxide and an alkaline metal compound and/or an alkaline-earth metal compound.

The metal oxide may be for example a transition metal oxide, for example, an oxide including Nb, Sr, Bi, Ti, Re, V, Os, Ru, Ta, Ir, W, Ga, Mo, In, Cr, Rh, Mn, Co, Fe, or a combination thereof, for example, $Nb_2O_5$, but is not limited thereto. The metal oxide may be, for example, in a form of a hydrate, a non-hydrate, or a mixture of a hydrate and a non-hydrate.

The alkaline metal compound and/or the alkaline-earth metal compound may be for example, a compound including Ca, K, or a combination thereof, for example, $CaCO_3$, $K_2CO_3$, or the like, but is not limited thereto.

A mixing ratio of the metal oxide and the alkaline metal compound and/or the alkaline-earth metal compound may be appropriately selected considering the composition of the ceramic material to be prepared, for example, about 0.1 moles (mol) to about 1 mol of the alkaline metal compound and/or the alkaline-earth metal compound may be mixed per 1 mol of the metal oxide, but is not limited thereto. The heat treatment may be performed at about 750° C. to about 1800° C. for about 5 hours to about 50 hours under an inert atmosphere such as an argon atmosphere or vacuum, but is not limited thereto.

Figure 4:
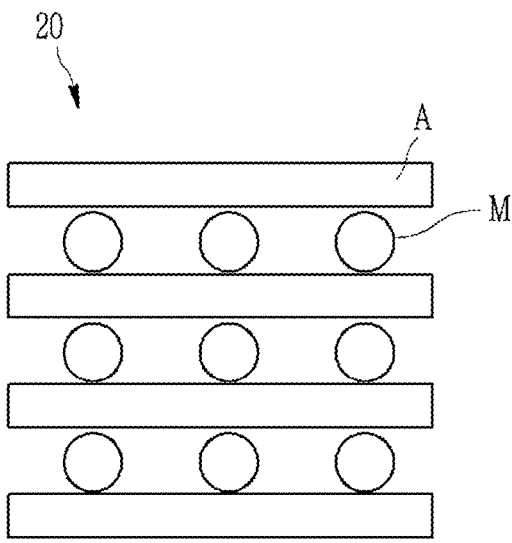

Referring to FIG. 4, the layered ceramic material 20 may have a three-dimensional structure in which an alkali metal and/or an alkaline-earth metal M are/is disposed between a plurality of nanosheets A. The alkali metal and/or the alkaline-earth metal M may be present in a form of a metal cation. The layered ceramic material 20 may be pulverized to obtain a layered ceramic powder.

The layered ceramic material 20 may be exfoliated in various ways, for example, may be exfoliated by a sequential ion-exchange of a protonic acid, an organic cation using an osmotic pressure, and an intercalation reaction.

Figure 5:
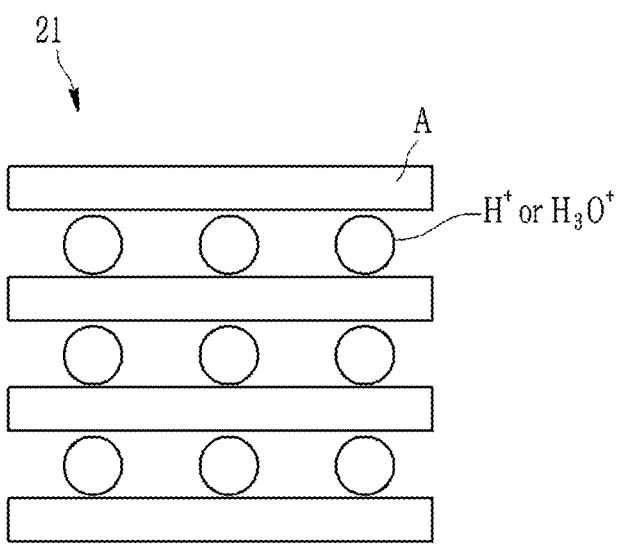

For example, referring to FIG. 5, the layered proton-exchanged ceramic material 21 may be obtained by acid-exchanging the layered ceramic material 20 with an acidic solution such as hydrochloric acid, nitric acid, sulfuric acid to substitute at least a part of an alkaline metal and/or an alkaline-earth metal (M) with a proton (H$^+$) and/or a hydronium ion (H$_3$O$^+$). A concentration, a treatment temperature, and a treatment time, and the like of the acidic solution may be appropriately selected, but is not particularly limited.

Figure 6:
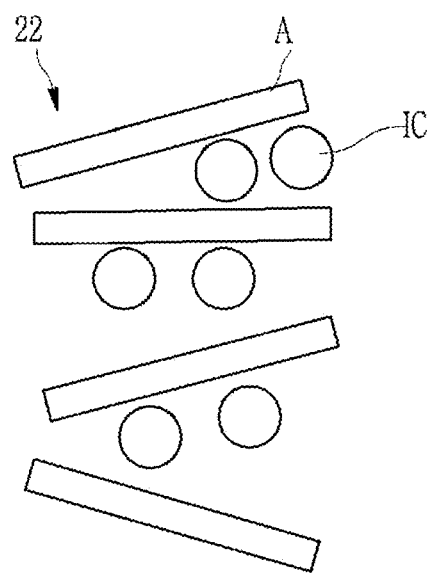

Subsequently, referring to FIG. 6, the layered proton-exchanged ceramic material 21 is intercalated with an intercalant IC to provide an intercalated layered ceramic material 22. The intercalant (IC) is intercalated between nanosheets A of the layered proton-exchanged ceramic material 21 to separate the plurality of nanosheets A. The intercalation may be for example performed by using an organic material intercalant, for example, a C1 to C20 alkylammonium salt compound as an intercalant (IC), but is not limited thereto. The alkylammonium salt compound may be for example a tetramethylammonium compound such as tetramethylammonium hydroxide, a tetraethyl ammonium compound such as tetraethylammonium hydroxide, a tetrapropylammonium compound such as tetrapropylammonium hydroxide, a tetrabutylammonium compound such as tetrabutylammonium hydroxide and/or a benzylalkylammonium compound such as benzylmethylammonium hydroxide, but is not limited thereto.

The alkylammonium salt compound may be provided as an aqueous solution, and the concentration of the alkylammonium salt aqueous solution may be about 0.01 to about 20 mole percent (mol %), based on a molar content of the proton (H$^+$) and/or hydronium ion (H$_3$O$^+$) of the layered proton-exchanged ceramic material 21. A temperature and a time of the intercalation are not particularly limited, for example, the intercalation may be performed at about 25 to about 80° C. for about 1 day to about 5 days, but is not limited thereto. For effective exfoliation, centrifuge, ultrasonic wave, or a combination thereof may be further performed.

The intercalated layered ceramic material 22 may be separated into layers to be exfoliated into a plurality of nanosheets A. Nanosheet A may be a monocrystal ceramic nanosheet and may be stably dispersed in a solvent and be present as a colloid. The solvent may be, for example, a solvent having a high permittivity, for example, water, alcohol, acetonitrile, dimethylsulfoxide, dimethyl formamide, propylenecarbonate, or a combination thereof, but is not limited thereto.

A nanosheet solution including a plurality of nanosheets A may be coated on an electrode 11 according to a solution process to provide a 2-dimensional nanosheet monolayer film 13aa, for example, the electrode may be coated according to a Langmuir-Blodgett method, a layer-by-layer method, a spin coating, a slit coating, a bar coating, or a dip coating, but is not limited thereto. The coating may be performed one time or two or more times, and a plurality of 2-dimensional nanosheet monolayers may be obtained by performing the same 2 or more times.

For example, the 2-dimensional nanosheet monolayer may be obtained according to a Langmuir-Blodgett method.

Figure 7:
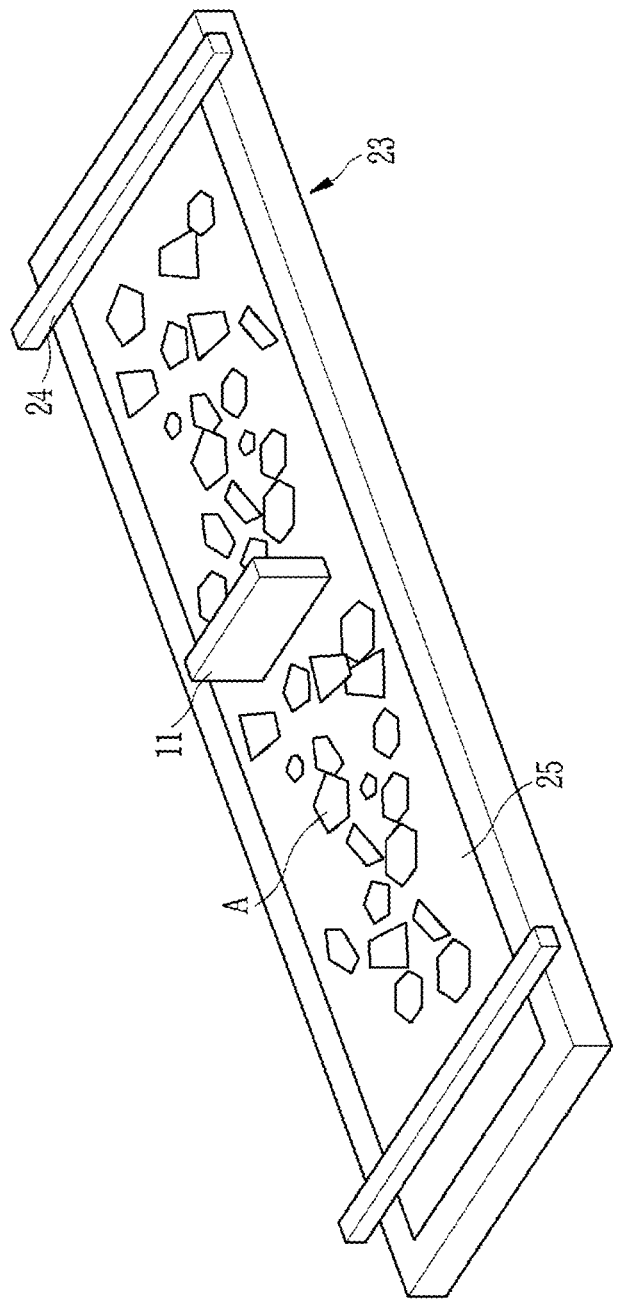
Figure 8:
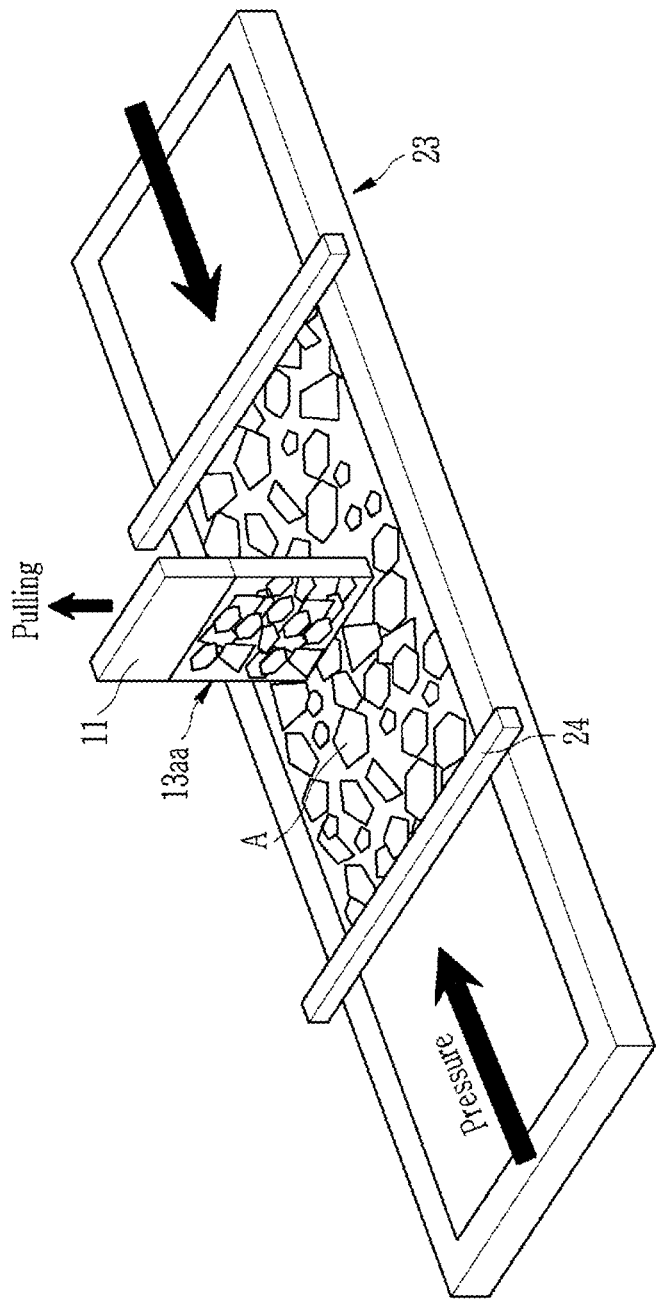
Figure 9:
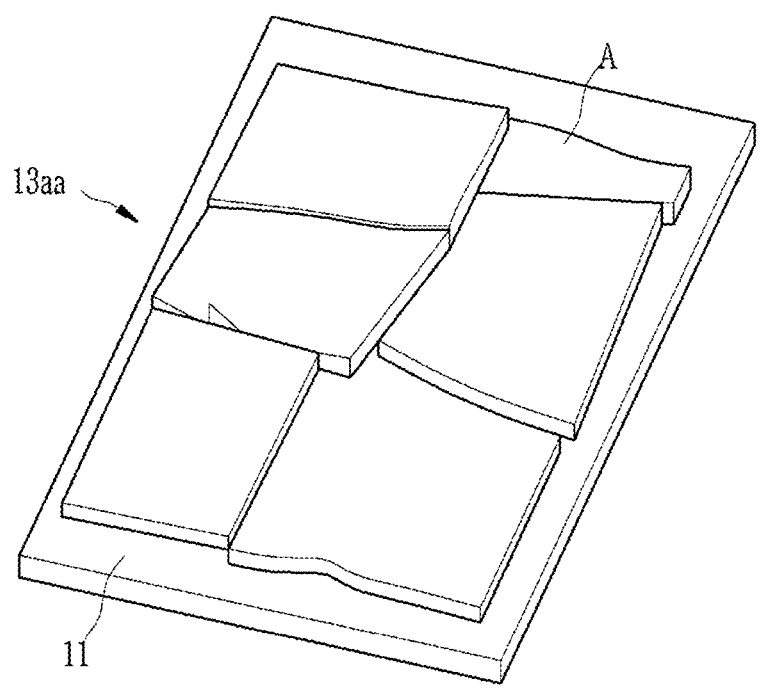
Figure 10:
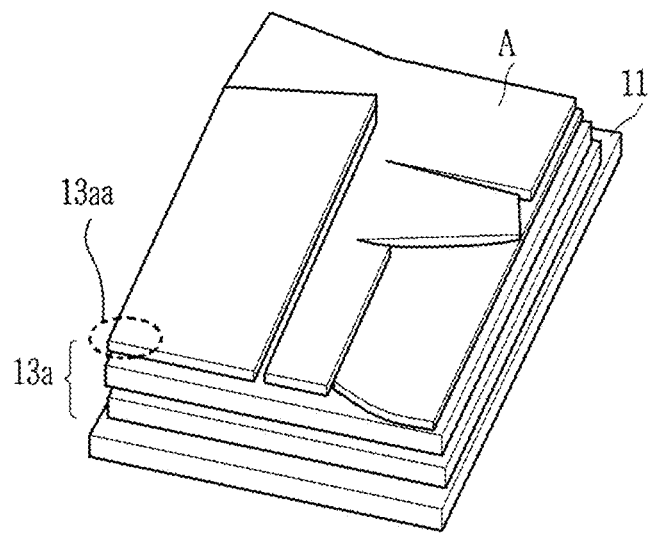

For example, referring to FIG. 7, an electrode 11 may be disposed in a vertical direction in or relative to a bath 23, and a nanosheet solution 25 including a plurality of nanosheets A may be filled therein, e.g., included in the bath. Subsequently, referring to FIG. 8, barriers 24 disposed on the both ends of the bath 23 may be pressed toward the electrode 11, and the electrode 11 may be pulled in a vertical direction relative to the bath 23 to attach the plurality of nanosheets A on the electrode 11. Subsequently, referring to FIG. 9, the electrode 11 attached with a plurality of nanosheets A may be separated from the bath 23 and dried to provide a 2-dimensional nanosheet monolayer film 13aa that the plurality of nanosheets A is arranged in a lateral direction, e.g., a same direction as the vertical direction relative to the bath 23. Subsequently, referring to FIG. 10, a plurality of 2-dimensional nanosheet monolayer films 13aa may be laminated according to the same method to provide a multi-layer dielectric layer 13a.

The multi-layer dielectric layer 13a may have a structure including a laminated plurality of 2-dimensional nanosheet monolayer films 13aa, and may also include an organic material attached and/or adsorbed during the exfoliating and coating steps. The organic material may be mostly derived from, for example, an intercalant used in the exfoliating step.

Figure 11:
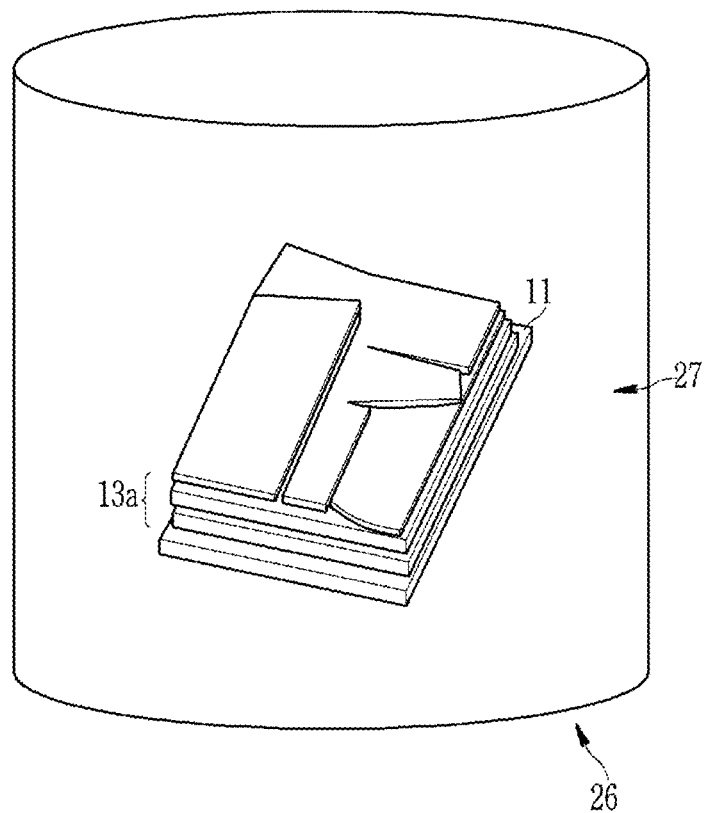

In order to remove the organic material, the multi-layer dielectric layer 13a may be treated with acid. The acid treatment may be performed by contacting, for example, strong acid, weak acid, or a combination thereof with the multi-layer dielectric layer 13a, for example, by contacting hydrochloric acid, nitric acid, sulfuric acid, or a combination thereof with the multi-layer dielectric layer 13a. The acid treatment may performed by, for example, a solution process, for example, the multi-layer dielectric layer 13a may be coated with an acidic solution, which may be performed by, for example, a dip coating, a spin coating, a slit coating, an inkjet coating, a bar coating, or a combination thereof. FIG. 11 shows an embodiment of the acid treatment in which the multi-layer dielectric layer 13a is dipped into a bath 26 filled with the acidic solution 27 to treat the multi-layer dielectric layer 13a with an acid by a dip coating.

The acid treatment may be performed at, for example, a room temperature or a higher temperature than the room temperature, for example, at about 25° C. to about 100° C. for about 1 hour to about 10 hours, at about 40° C. to about 100° C. for about 1 hour to about 10 hours, at about 50° C. to about 100° C. for about 1 hour to about 5 hours, or at about 60° C. to about 80° C. for about 1 hour to about 5 hours.

Figure 12:
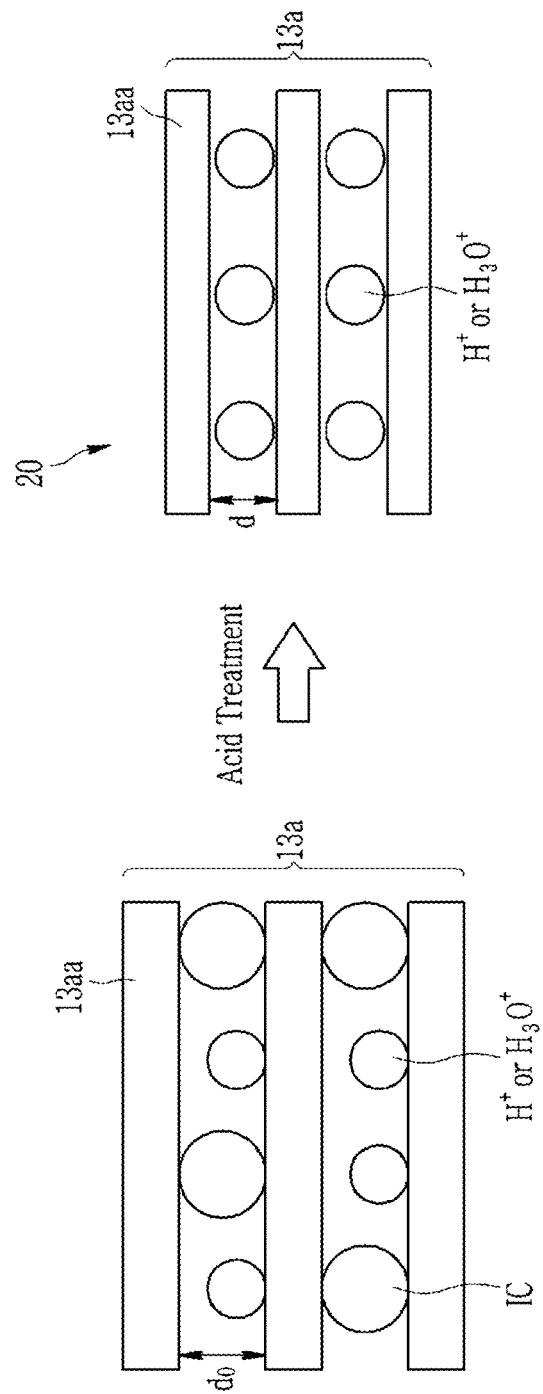

Referring to FIG. 12, the organic material including the intercalant IC is effectively decreased or removed by the acid treatment, and the site of the organic material decrease or removal is substituted with a proton and/or a hydronium ion. The gap (d) between adjacent 2-dimensional nanosheet monolayer films 13aa after the acid treatment may be reduced compared to the interval (d$_0$) between adjacent 2-dimensional nanosheet monolayer films 13aa before the acid treatment, the total thickness of the multi-layer dielectric layer 13a may be decreased, and a capacitance of a capacitor may be enhanced.

The dielectric layer 13 may further include another dielectric material besides the multi-layer dielectric layer 13a.

Hereinafter, the ceramic electronic component according to an embodiment is described.

Figure 13:
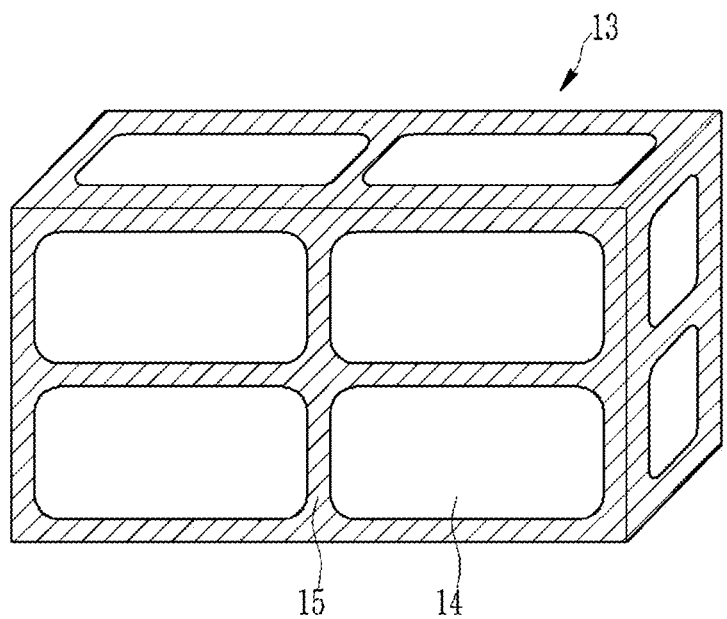
FIG. 13 is a schematic perspective view of a capacitor as an embodiment of a ceramic electronic component.
Figure 14:
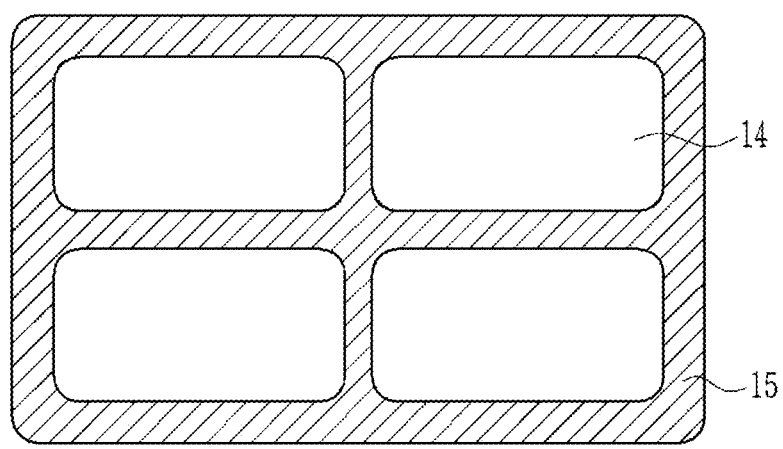
FIG. 14 is a schematic cross-sectional view illustrating a cross-section of the dielectric layer of the capacitor of FIG. 13, FIGS. 15 and 16 are schematic cross-sectional views illustrating various structures of the dielectric layer of the capacitor of FIG. 13.

FIG. 13 is a schematic perspective view of a capacitor as an embodiment of a ceramic electronic component, and FIG. 14 is a schematic cross-sectional view illustrating a cross-section of the dielectric layer of the capacitor of FIG. 13.

The ceramic electronic component according to an embodiment includes a pair of electrodes 11 and 12 facing each other and a dielectric layer 13 disposed between the pair of electrode 11 and 12.

The dielectric layer 13 of the ceramic electronic component according to an embodiment may include a composite material of a bulk ceramic dielectric material and the multi-layer dielectric layer.

For example, as shown in FIGS. 13 and 14, the dielectric layer 13 may include a plurality of grains 14 and a grain boundary 15 surrounding a border of the grain 14. Although a part of the dielectric layer 13 is schematically shown in the drawings, a plurality of grains 14 surrounded with the grain boundary 15 may be repeatedly disposed along with a plurality of rows and/or columns, e.g., two or more rows and/or two or more columns may be present, and each row and/or column may include two or more grains 14 surrounded with the grain boundary 15, or the plurality of grains 14 surrounded with the grain boundary 15 may be randomly disposed, e.g., two or more grains 14 surrounded with the grain boundary 15 may not be present in rows and/or columns.

The grain 14 may be a 3-dimensional bulk dielectric material which is not exfoliated, and may include, for example, a metal oxide having a permittivity of greater than or equal to about 100, for example, a metal oxide including barium (Ba), strontium (Sr), and/or titanium (Ti), for example, barium titanate, strontium titanate, barium strontium titanate, lead titanate, lead zirconate, lead zirconate titanate, or a combination thereof, but is not limited thereto.

The grain 14 may further include a donor element and/or an acceptor element on the bulk dielectric material. The donor element and/or the acceptor element may be, for example, a metal element or metalloid, and the donor element may be, for example, La, Sm, Dy, Ho, Y, Nd, Ce, Nb, Ta, W, or a combination thereof, and the acceptor element may be, for example, Mn, Co, Ni, Cr, or a combination thereof, but is not limited thereto. The bulk dielectric material may have oxygen vacancy, and the donor element and/or the acceptor element may be solid-dissolved in the bulk dielectric material. By further including the donor element and/or the acceptor element on the bulk dielectric material, the electric characteristics of the bulk dielectric material is changed effectively to provide semi-conductivity, conductivity, or insulation property.

An average particle diameter of the grain 14 may be variously determined considering an apparent relative permittivity of a capacitor, and may be for example less than or equal to about 1.5 μm, less than or equal to about 1.4 μm, less than or equal to about 1.3 μm, less than or equal to about 1.2 μm, less than or equal to about 1.1 μm, less than or equal to about 1.0 μm, less than or equal to about 900 nm, less than or equal to about 800 nm, less than or equal to about 700 nm, less than or equal to about 600 nm, less than or equal to about 500 nm, or less than or equal to about 300 nm, and for example greater than or equal to about 50 nm, greater than or equal to about 60 nm, greater than or equal to about 70 nm, greater than or equal to about 80 nm, greater than or equal to about 90 nm, or greater than or equal to about 100 nm, but is not limited thereto.

The grain boundary 15 may include the multi-layer dielectric layer 13a. Details of the multi-layer dielectric layer 13a are the same as described above.

For example, the grain boundary 15 may be directly contacted to the grain 14, or at least a part of the grain boundary 15 may be spaced apart from the grain 14. For example, the grain boundary 15 may surround the whole of the grain 14 or may surround one part of the grain 14.

A thickness of the grain boundary 15 may be smaller than a thickness of the grain 14, for example, less than or equal to about 100 nm, less than or equal to about 80 nm, less than or equal to about 70 nm, less than or equal to about 50 nm, less than or equal to about 30 nm, less than or equal to about 20 nm, less than or equal to about 10 nm, or less than or equal to about 5 nm, but is not limited thereto.

Capacitance may be formed, e.g., present, on the grain boundary 15 disposed between adjacent grains 14 when applying a predetermined voltage to adjacent grains 14, and the ceramic electronic component according to an embodiment may effectively function as a capacitor. In addition, as the plurality of grains 14 surrounded with the grain boundary 15 may be disposed along with, e.g., in, one or more rows and/or one or more columns or may be randomly disposed to be connected to each other in serial and/or parallel, the ceramic electronic component according to an embodiment may function as a capacitor having an improved capacitance.

Figure 15:
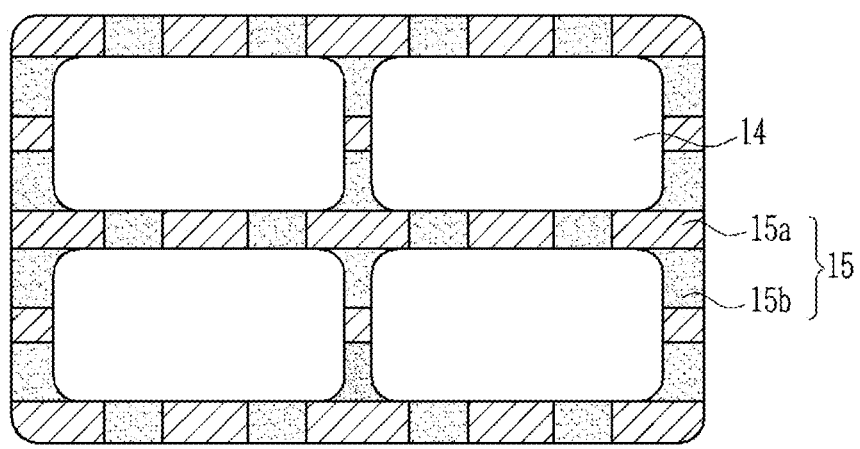
Figure 16:
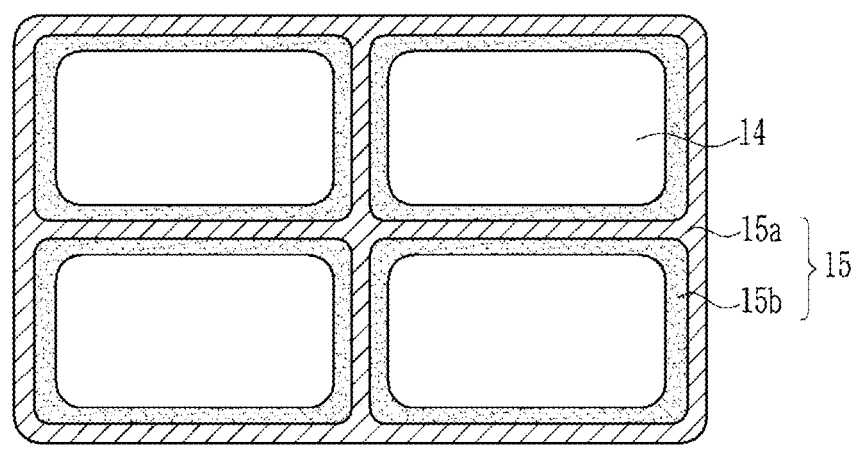

FIGS. 15 and 16 are schematic cross-sectional views illustrating various structures of the dielectric layer of the capacitor of FIG. 13.

Referring to FIGS. 15 and 16, the dielectric layer 13 includes a plurality of grains 14 surrounded with the grain boundary 15, and the grain boundary 15 may further include a bulk dielectric material besides the multi-layer dielectric layer.

For example, the grain boundary 15 may include a region 15a including the multi-layer dielectric layer and a region 15b including the bulk dielectric material, for example, as shown in FIG. 15, the grain boundary 15 may include a plurality of discontinuous regions 15a including the multi-layer dielectric layer and a plurality of discontinuous regions 15b including the bulk dielectric material; in an embodiment, as shown in FIG. 16, the region 15a including the multi-layer dielectric layer and the region 15b including the bulk dielectric material may be disposed in a continuous stripe shape. The region 15a including the multi-layer dielectric layer and the region 15b including the bulk dielectric material may be disposed in various shapes, but is not limited thereto.

Hereinafter, a method of manufacturing a ceramic electronic component shown in FIGS. 13 and 14 is described.

The method of manufacturing a ceramic electronic component according to an embodiment may include forming a dielectric layer 13 on an electrode 11, treating the dielectric layer 13 with an acid, and forming an electrode on the dielectric layer 13.

According to an embodiment, the dielectric layer 13 may be formed from a composite material of the bulk dielectric material and the multi-layer dielectric layer.

For example, the composite material may be obtained by mixing the bulk dielectric material and the multi-layer dielectric layer and sintering the same. A dielectric layer 13 including a plurality of grains 14 including the bulk dielectric material and a grain boundary 15 including the multi-layer dielectric layer may be provided.

For example, the composite material may be obtained by coating the multi-layer dielectric layer on the surface of each bulk dielectric material to prepare a multi-layer dielectric layer-coated bulk dielectric material, and sintering the plurality of the coated bulk dielectric materials. Coating the multi-layer dielectric layer on the surface of each bulk dielectric material may be performed by coating the obtained multi-layer dielectric layer on the surface of each bulk dielectric material, or forming a 2-dimensional nanosheet monolayer on the surface of each bulk dielectric material and repeating the same at least one time to form a multi-layer dielectric layer. A dielectric layer 13 having a plurality of grains 14 including a bulk dielectric material and a grain boundary 15 including a multi-layer dielectric layer may be obtained.

The treating of the dielectric layer 13 with an acid may be performed by contacting an acid with the dielectric layer 13 including the composite material, for example, the composite material may be treated with an acid according to a dip coating, a spin coating, a slit coating, an inkjet coating, a bar coating, or a combination thereof. Details of the acid treatment are the same as described above.

Figure 17:
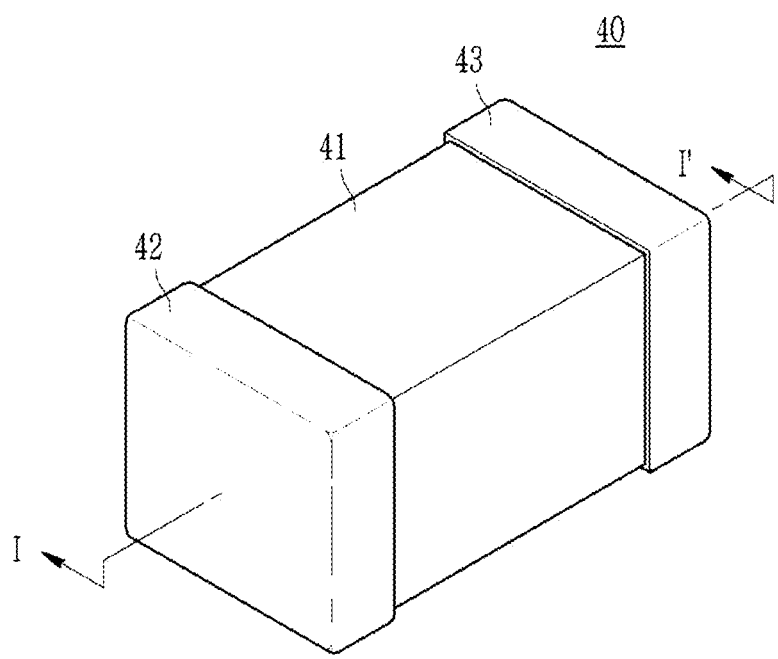
FIG. 17 is a schematic perspective view of a ceramic electronic component according to an embodiment.
Figure 18:
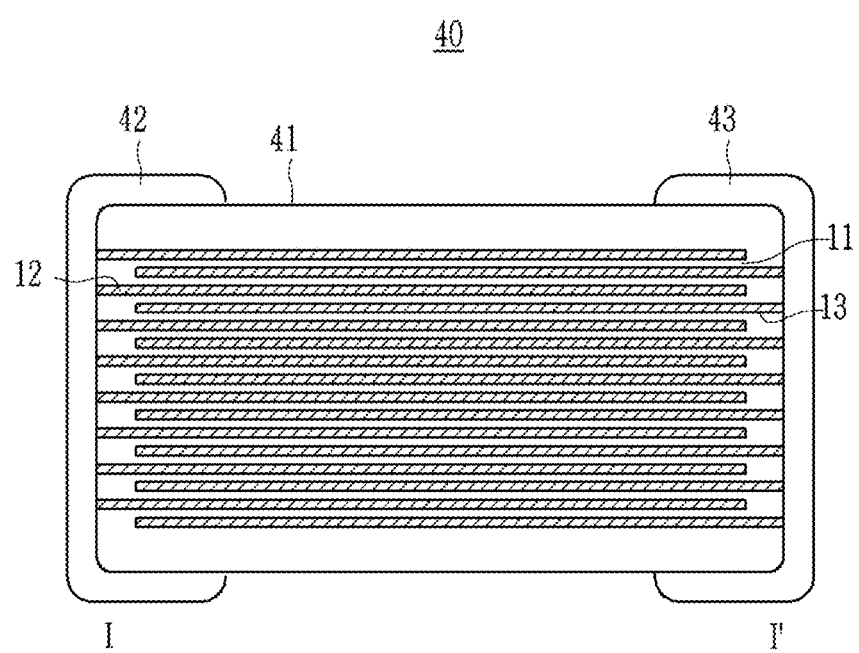
FIG. 18 is a cross-sectional view of the ceramic electronic component shown in FIG. 17 taken along an I-I' direction.

FIG. 17 is a schematic perspective view of a ceramic electronic component according to an embodiment and FIG. 18 is a cross-sectional view of the ceramic electronic component shown in FIG. 17 taken along an I-I' direction.

The ceramic electronic component according to an embodiment is a multi-layer ceramic capacitor (MLCC) 40 having a structure including a laminated plurality of capacitors shown in FIG. 1.

Referring to FIGS. 17 and 18, the multi-layer ceramic capacitor 40 includes a capacitor body 41 and external electrodes 42 and 43. The capacitor body 41 has a structure including a laminated plurality of capacitors 10 shown in FIG. 1, and each capacitor includes electrodes (internal electrodes) 11 and 12 and a dielectric layer 13, as described above. Details are the same as described above.

As an example of the ceramic electronic component, a capacitor and a multi-layer ceramic capacitor are described above, but are not limited thereto, and all electronic components using ceramic may include the ceramic electronic component.

The ceramic electronic component such as the capacitor and the multi-layer ceramic capacitor may be included in a variety of electronic devices, for example, may be employed for an image device such as a liquid crystal display (LCD), a computer, and a mobile phone, or the like.

Hereinafter, the embodiments are illustrated in more detail with reference to examples. However, these examples are exemplary and the scope of the present disclosure is not limited thereto.

Synthesis of $KCa_2Nb_3O_3$ Ceramic Material (Mother Phase)

$K_2CO_3$:$CaCO_3$:$Nb_2O_5$ is added at a ratio of 1.1:2:3 into ethanol and uniformly mixed for 24 hours using a ball mill. Subsequently, the mixture is dried while mixing the same in a beaker using a magnetic bar and a hot plate. For the sufficient drying, the mixture is further dried in an oven at 100° C. for 1 day. Subsequently, the mixture is heat-treated at 1200° C. for 12 hours under an air atmosphere to provide a $KCa_2Nb_3O_{10}$ mother phase.

Preparation of Nanosheet Solution 5 grams (g) of the obtained $KCa_2Nb_3O_{10}$ mother phase is added into 200 cubic centimeters ($cm^3$) of $HNO_3$ aqueous solution having a concentration of 5 molar (M) and reacted for 72 hours to substitute potassium ion ($K^+$) with a proton ($H^+$) and/or a hydronium ion ($H_3O^+$). Subsequently, it is neutralized using distilled water and sufficiently dried under the air atmosphere and sufficiently dried in an oven for 1 day or longer. Subsequently, 0.4 g of hydrogen-substituted $HCa_2Nb_3O_{10} \cdot 1.5H_2O$ is dipped in a tetrabutylammonium hydroxide solution (TBAOH) to substitute proton ($H^+$) and/or hydronium ion ($H_3O^+$) with tetrabutylammonium (TBA), and it is exfoliated into a plurality of nanosheets. $HCa_2Nb_3O_{10} \cdot 1.5H_2O$ and TBAOH are mixed at a mole ratio of 1:1. The exfoliation is performed at a room temperature for 14 hours. After centrifuging the same at 2000 revolutions per minute (rpm) for 30 minutes, only ⅔ of the supernatant is obtained, and the solid residue is discarded.

Subsequently, the centrifuged supernatant is dialyzed using a membrane to provide a nanosheet solution.

Fabrication of Capacitor

EXAMPLE 1

A Pt electrode is formed on a Si substrate laminated with $SiO_2$ and $TiO_2$ in a thickness of 200 nanometers (nm) by a sputtering to provide a lower electrode. Subsequently, the obtained nanosheet solution is coated on the lower electrode according to a Langmuir-Blodgett method (KSV NIMA) at speed of raising a substrate of 0.5 millimeters per minute (mm/min) and a surface pressure of 12 millinewtons/meter (mN/m) to provide a 2-dimensional nanosheet monolayer film. Subsequently, the coating and drying are repeated an additional 9 times to provide a multi-layer dielectric layer including total 10 layers of 2-dimensional nanosheet monolayer film. Subsequently, the multi-layer dielectric layer is treated with an acid by dipping the same in a hydrochloric acid solution (30 volume percent (vol %)) at 80° C. for 3 hours and dried. Subsequently, a Pt electrode is formed on the dielectric layer to provide a capacitor.

EXAMPLE 2

A capacitor is fabricated in accordance with the same procedure as in Example 1, except that the acid treatment of the multi-layer dielectric layer is performed in a hydrochloric acid solution (24 vol %) at 80° C.

EXAMPLE 3

A capacitor is fabricated in accordance with the same procedure as in Example 1, except that the acid treatment of the multi-layer dielectric layer is performed in a hydrochloric acid solution (24 vol %) at 60° C.

EXAMPLE 4

A capacitor is fabricated in accordance with the same procedure as in Example 1, except that the acid treatment of the multi-layer dielectric layer is performed in a hydrochloric acid solution (24 vol %) at 25° C.

EXAMPLE 5

A capacitor is fabricated in accordance with the same procedure as in Example 1, except that the acid treatment of the multi-layer dielectric layer is performed in a nitric acid solution (50 vol %) at 80° C.

EXAMPLE 6

A capacitor is fabricated in accordance with the same procedure as in Example 1, except that the acid treatment of the multi-layer dielectric layer is performed in a nitric acid solution (30 vol %) at 80° C.

EXAMPLE 7

A capacitor is fabricated in accordance with the same procedure as in Example 1, except that the acid treatment of the multi-layer dielectric layer is performed in a nitric acid solution (50 vol %) at 60° C.

EXAMPLE 8

A capacitor is fabricated in accordance with the same procedure as in Example 1, except that the acid treatment of the multi-layer dielectric layer is performed in a nitric acid solution (50 vol %) at 25° C.

COMPARATIVE EXAMPLE 1

A capacitor is fabricated in accordance with the same procedure as in Example 1, except that the acid treatment of the multi-layer dielectric layer is not performed.

REFERENCE EXAMPLE

A capacitor is fabricated in accordance with the same procedure as in Example 1, except that ultraviolet (UV) is irradiated on the surface of each 2-dimensional nanosheet monolayer of the multi-layer dielectric layer to remove an organic material, instead of performing the acid treatment of the multi-layer dielectric layer.

Evaluation
Evaluation 1

The multi-layer dielectric layers of the capacitors of Examples 1 to 8, Comparative Example 1, and the Reference Example are evaluated for a remaining amount of an organic material and a hydrogen content.

The remaining amount of the organic material is evaluated by the carbon content remained in the multi-layer dielectric layer, and the carbon content and the hydrogen content are measured using secondary ion mass spectrometry (SIMS).

Figure 19:
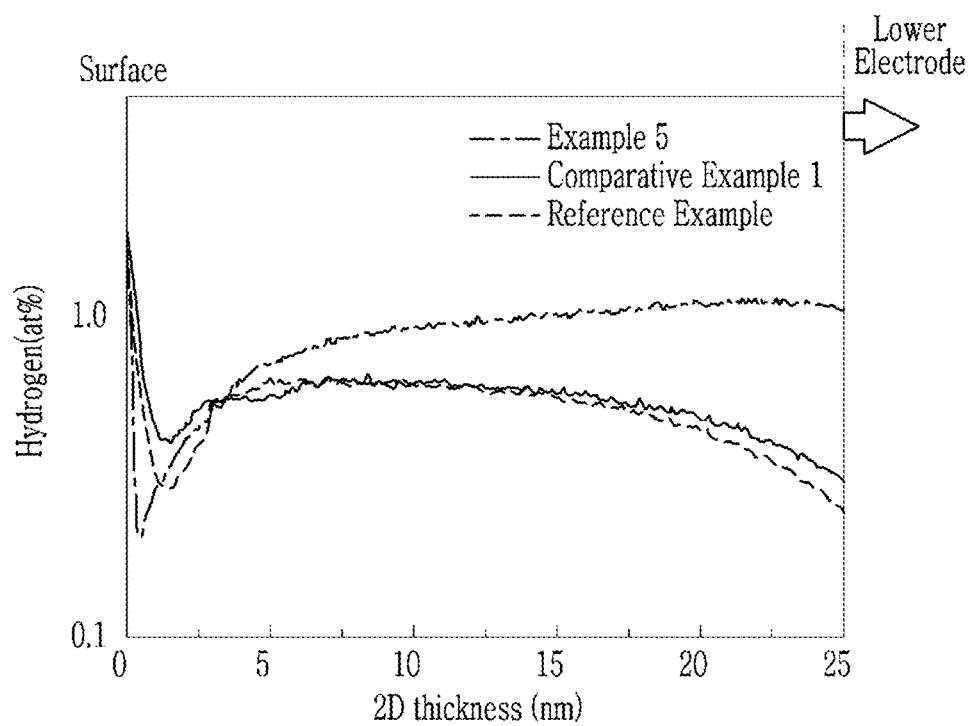
FIG. 19 is a graph of hydrogen (atomic percent (at %)) versus 2-dimensional (2D) thickness (nanometers (nm)) showing proton content according to a depth of the multi-layer dielectric layer of the capacitors of Example 5, Comparative Example 1, and the Reference Example.

The results are shown in Table 1 and FIG. 19.

FIG. 19 is a graph showing proton content of the multi-layer dielectric layers of the capacitors of Example 5, Comparative Example 1, and the Reference Example, depending upon a depth.

In Table 1, the hydrogen content is a hydrogen content on the surface contacting the lower electrode.

TABLE 1

|  | Carbon content (atomic percent (at %)) | Hydrogen content (at %) |
|---|---|---|
| Example 1 | 1.1 | 1.08 |
| Example 2 | 2.2 | 0.96 |
| Example 3 | 2.5 | 0.77 |
| Example 4 | 3.2 | 0.55 |
| Example 5 | 0.8 | 1.15 |
| Example 6 | 2.1 | 0.92 |
| Example 7 | 2.5 | 0.74 |
| Example 8 | 3.0 | 0.62 |
| Comparative Example 1 | 4.0 | 0.3 |

Referring to Table 1 and FIG. 19, it is confirmed that hydrogen content is increased, but carbon content is decreased in the multi-layer dielectric layers of the capacitors of Examples 1 to 8. For example, it is confirmed that a proton is uniformly present along with, e.g., in, a thickness direction (depth) in, e.g., of, the multi-layer dielectric layer of the capacitor of Example 5, and while not wanting to be bound by theory, it is understood that protons are diffused and flow into the multi-layer dielectric layer during the acid treatment.

Evaluation 2

The multi-layer dielectric layers of the capacitors of Examples 1 to 8 and Comparative Example 1 are evaluated for an interlayer spacing and a capacitance.

The interlayer spacing is measured by X-ray diffraction.

The capacitance is measured by: uniformly coating an In—Ga electrode on the both surfaces of a pellet specimen to provide an electrode and measuring the same using an E4980A LCR meter (manufactured by Keysight technologies) under the conditions of 1 root mean square volts (Vrms) and 1 kilohertz (kHz).

The results are shown in Table 2.

TABLE 2

|  | Interlayer spacing (d, nm) | Capacitance (nanofarads (nF)) |
|---|---|---|
| Example 1 | 1.57 | 2.12 |
| Example 2 | 1.60 | 1.96 |
| Example 3 | 1.65 | 1.65 |
| Example 5 | 1.55 | 2.21 |
| Example 6 | 1.58 | 2.02 |
| Example 7 | 1.62 | 1.85 |
| Comparative Example 1 | 1.69 | 1.55 |

Referring to Table 2, it is confirmed that the capacitors of Examples 1-3 and 5-6 have smaller interlayer spacing of the multi-layer dielectric layer and greater capacitance than the capacitor of Comparative Example 1.

Evaluation 3

The capacitors of Examples 1 to 8 and Comparative Example 1 are evaluated for a capacitance density.

The capacitance density is measured using an E4980A LCR meter (manufactured by Keysight technologies) under the conditions of 1 Vrms and 1 kHz.

The results are shown in Table 3.

TABLE 3

|  | Capacitance density (@2 volts (V), microfarads per square centimeter ($\mu F/cm^2$)) |
|---|---|
| Example 1 | 1.8 |
| Example 2 | 1.4 |
| Example 3 | 1.0 |
| Example 5 | 2.1 |
| Example 6 | 1.3 |
| Example 7 | 0.9 |
| Comparative Example 1 | 0.7 |

Referring to Table 3, it is confirmed that the capacitors of Examples 1-3 and 5-7 have greater capacitance density than the capacitor of Comparative Example 1.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:
1. A ceramic electronic component, comprising
a first electrode and a second electrode facing each other; and
a dielectric layer between the first electrode and the second electrode, wherein the dielectric layer comprises a multi-layer dielectric layer comprising a 2-dimensional nanosheet monolayer film comprising a plurality of ceramic nanosheets arranged in a lateral direction, the lateral direction being orthogonal to a thickness direction of the 2-dimensional nanosheet monolayer film, the multi-layer dielectric layer has a first surface contacting the first electrode and a second surface facing the first surface, the multi-layer dielectric layer comprises a proton or a hydronium ion between layers of the multi-layer dielectric layer, and a proton content of the multi-layer dielectric layer according to secondary ion mass spectrometry is constant or increasing in a direction from the second surface toward the first surface.

2. The ceramic electronic component of claim 1, wherein a proton content at the first surface of the multi-layer dielectric layer according to secondary ion mass spectrometry is greater than or equal to about 0.5 atomic percent.

3. The ceramic electronic component of claim 1, wherein a gap between adjacent layers of the monolayer dielectric layer is less than or equal to about 1.65 nanometers.

4. An electronic device comprising the ceramic electronic component of claim 1.

5. A ceramic electronic component, comprising
a first electrode and a second electrode facing each other; and
a dielectric layer between the first electrode and the second electrode,
wherein the dielectric layer comprises a multi-layer dielectric layer comprising a 2-dimensional nanosheet monolayer film comprising a plurality of ceramic nanosheets arranged in a lateral direction, the lateral direction being orthogonal to a thickness direction of the 2-dimensional nanosheet monolayer film,
the multi-layer dielectric layer comprises a proton or a hydronium ion between layers of the multi-layer dielectric layer, and
a carbon content of the multi-layer dielectric layer according to secondary ion mass spectrometry is less than or equal to about 3.5 atomic percent.

6. The ceramic electronic component of claim 5, wherein he carbon content of the multi-layer dielectric layer according to secondary ion mass spectrometry is less than or equal to about 2.5 atomic percent.

7. An electronic device comprising the ceramic electronic component of claim 5.

8. A ceramic electronic component, comprising
a first electrode and a second electrode facing each other; and
a dielectric layer between the first electrode and the second electrode,
wherein the dielectric layer comprises a multi-layer dielectric layer comprising a 2-dimensional nanosheet monolayer film comprising a plurality of ceramic nanosheets arranged in a lateral direction, the lateral direction being orthogonal to a thickness direction of the 2-dimensional nanosheet monolayer film,
the multi-layer dielectric layer comprises a proton or a hydronium ion between layers of the multi-layer dielectric layer, and
the dielectric layer comprises a composite material comprising a bulk ceramic dielectric material and the multi-layer dielectric layer.

9. The ceramic electronic component of claim 8, wherein the dielectric layer comprises
a plurality of grains comprising the bulk ceramic dielectric material, and
a grain boundary comprising the multi-layer dielectric layer.

10. An electronic device comprising the ceramic electronic component of claim 8.

* * * * *